(12) United States Patent
Tahir et al.

(10) Patent No.: US 11,171,773 B2
(45) Date of Patent: Nov. 9, 2021

(54) CLIENT-SERVER COMPUTER SYSTEM

(71) Applicant: City, University of London, London (GB)

(72) Inventors: Shahzaib Tahir, London (GB); Muttukrishnan Rajarajan, London (GB)

(73) Assignee: CITY, UNIVERSITY OF LONDON, London (GB)

( * ) Notice: Subject to any disclaimer, the term of this patent is extended or adjusted under 35 U.S.C. 154(b) by 0 days.

(21) Appl. No.: 17/121,529

(22) Filed: Dec. 14, 2020

(65) Prior Publication Data

US 2021/0194670 A1    Jun. 24, 2021

Related U.S. Application Data

(63) Continuation of application No. PCT/GB2019/053490, filed on Dec. 10, 2019.

(30) Foreign Application Priority Data

Jan. 10, 2019 (GB) ...................................... 1900354

(51) Int. Cl.
*H04L 9/00* (2006.01)
*H04L 9/30* (2006.01)
(Continued)

(52) U.S. Cl.
CPC ............ *H04L 9/008* (2013.01); *G06F 16/338* (2019.01); *G06F 16/3322* (2019.01); *H04L 9/0825* (2013.01); *H04L 9/302* (2013.01)

(58) Field of Classification Search
CPC ....... H04L 9/008; H04L 9/0825; H04L 9/302; H04L 9/00; H04L 9/30; H04L 9/08; G06F 16/3322; G06F 16/338; G06F 16/332
See application file for complete search history.

(56) References Cited

U.S. PATENT DOCUMENTS

| 10,181,049 | B1 | 1/2019 | El Defrawy et al. | |
| 10,601,593 | B2 * | 3/2020 | Antonopoulos | ........ H04L 9/088 |
| 2018/0375838 | A1 * | 12/2018 | Hersans | .................. H04W 4/60 |

OTHER PUBLICATIONS

International Search Report and Written Opinion for International Application PCT/GB2019/053490, dated Jun. 23, 2020, 17 pages.

(Continued)

*Primary Examiner* — Quazi Farooqui
(74) *Attorney, Agent, or Firm* — Seed IP Law Group LLP (57) ABSTRACT

A client-server computer system (10) for a client (12) to search for a keyword in at least partially homomorphically encrypted documents (18) stored in a server (14) is disclosed. The client-server computer system (10) is configured as follows. The client (12) applies probabilistic symmetric encryption to a keyword to form a probabilistically encrypted keyword to form a first result. The client (12) applies deterministic symmetric encryption to the keyword to form a deterministically encrypted keyword, then computes a modular inverse of the deterministically encrypted keyword, and then applies at least partially homomorphic encryption to the modular inverse deterministically encrypted keyword to form a second result. The client (12) uses a session key to hash the first result to form a hash result. The client (12) combines the first result and second result to form a third result. The client (12) encrypts the third result and the hash result using a private key to generate the search query. The client (12) sends the search query to the server (14). The server (14) receives the search query from the client (12). The server (14) identifies at least one identifier of at least one document of the at least partially homomorphically encrypted documents including the keyword by decrypting, using a public key, a product of the search query and the hash result. The server (14) sends the at least one identifier in encrypted form to the client (12). The client (12) decrypts the at least one identifier.

10 Claims, 2 Drawing Sheets

(51) Int. Cl.
*H04L 9/08* (2006.01)
*G06F 16/332* (2019.01)
*G06F 16/338* (2019.01)

(56) References Cited

OTHER PUBLICATIONS

Tahir, et al., "A New Secure and Lightweight Searchable Encryption Scheme over Encrypted Cloud Data," IEEE Transactions on Emerging Topics in Computing, Aug. 2017, 16 pages.
Search Report for International Application GB1900354.0, dated Jun. 20, 2019, 3 pages.

* cited by examiner

CLIENT-SERVER COMPUTER SYSTEM

FIELD OF THE INVENTION

The present invention relates to a client-server computer system comprising a client and a server, and in particular, a client that is configured to search for a search term in encrypted documents stored on the server.

BACKGROUND OF THE INVENTION

In the client server model, a server runs one or more server programs which share their resources with clients and the clients request resources from the servers. The clients and servers communicate over a computer network. A client does not share any of its resources. A client requests resources from a server. An example of a client-server system is the cloud computing environment.

The cloud computing environment often, referred to simply as "the Cloud" is an environment designed for the provision of on-demand resource sharing and data access to remotely located clients and devices, Once data is outsourced to the Cloud, clients tend to lose control of their data thus becoming susceptible to data theft. To mitigate the chances of data theft, Cloud service providers employ methods like encrypting data prior to outsourcing it to the Cloud. Although this increases security, it also gives rise to the challenge of searching and sifting through the large amounts of encrypted documents present in the Cloud.

In order to search for the document containing a particular keyword, a known method is to download all of the documents stored on the cloud server, decrypt all of the documents and then search for a particular keyword in the decrypted documents. The problem with this arrangement is that it leads to high network latency.

Another known method is to pre-process the encrypted documents to generate an index table. The index table includes information on which document each keyword appears in. In this way, when a keyword is searched, the index table can be used to indicate which documents need to be decrypted to be searched through. Furthermore, the index table needs to be modified whenever a document in a database is modified or added. The index generation results in high client-side computations that become apparent whenever the database is modified, as well as increased network latency and high storage requirements at the server-side. In addition, index tables have their own security leakage.

Index tables require a lot of storage space because they require storage space of the order of M×N where M is the number of keywords and N is the number of documents. Index tables need to be replicated across all of the different cloud platforms. It is this that leads to network latency as the entire index table needs to be sent to the cloud. As, a result of this, arrangements using index tables are not scalable across cross cloud platforms. A limitation of known server side encryption strategies is that the tokens they generate are deterministic. This means that the same token will always be generated for the same keyword. As a result, searches leak statistical information about the user's search pattern.

BRIEF SUMMARY OF THE INVENTION

Broadly, the searchable encryption arrangement described herein allows for keywords to be searched directly over encrypted documents. The examples described can meet common user requirements of single sign-on. The examples described are based on dynamic and scalable data structure and allow cross-cloud scalability. In the examples described, there is no index table. In the examples described, search may be carried out directly over the documents dispersed across different clouds. Thus, security is significantly enhanced. It uses an efficient server side encryption scheme with probabilistic trapdoors. The arrangement described herein is a homomorphic-based searchable encryption scheme. The examples described are based on a partial homomorphic encryption scheme and, in particular examples, is based on the partially homomorphic properties of the Ron Rivest, Adi Shamir and Leonard Adleman Algorithm (RSA). RSA is an asymmetric cryptographic algorithm and by default it does not provide security against adaptive adversaries. Hence, it is prone to distinguishability attacks. The scheme described herein uses RSA over a symmetrically encrypted keyword that helps to mitigate distinguishability attacks. The examples described herein use the property of modular inverse to generate probabilistic trapdoors. This makes the scheme privacy-preserving and prevents against search pattern leakage. The examples disclosed provide for enhanced security. The examples provide non-repudiation. In particular, benefiting from the RSA algorithm, the homomorphic-based searchable encryption (HSE) scheme described herein provides non-repudiation of the trapdoors that are sent by the client. In other words, they provide data integrity. The examples disclosed can thwart an adaptive adversary from successful distinguishability attacks. The examples disclosed allow for the addition, modification and deletion of documents in run time. The examples described do not require a centralized data structure, such as an index table, and therefore pre-processing of the data, to achieve effective search. This reduces the client-side computations that are incurred in known index-based systems whenever the documents are added, deleted or modified. The removal of an index table reduces the network latency and the storage overhead. The example arrangements described are highly scalable, including for cross-cloud, cloud-of-clouds or nested cloud platforms. The example arrangements described are lightweight, practical and feasible. The scheme described herein achieves higher levels of security and privacy as compared to a searchable encryption scheme based on standard RSA. Therefore, the scheme can be deployed where data security is very important and the data is dispersed in Cloud hosts across different geographic locations. Broadly, in the arrangement described, when a user wishes to search for a keyword in encrypted documents stored in a cloud server using a client computer, the client computer generates a trapdoor or trapdoor function and sends it to the cloud server. In the examples described, the trapdoor is a product of a search query (or search token—an indication or identifier of the keyword—and an authorisation) and a hash result. The cloud server searches directly over the encrypted documents and identifies the encrypted documents containing the required keyword. The cloud server then sends the corresponding encrypted document identifiers to the client computer.

The invention in its various aspects is defined in the independent claims below to which reference should now be made. Advantageous features are set forth in the dependent claims.

Arrangements are described in more detail below and take, the form of a client-server computer system for a client to search for a keyword in at, least partially homomorphically encrypted documents stored in a server. The client-server computer system is configured as follows. The client applies probabilistic symmetric encryption to a keyword to form a probabilistically encrypted keyword to form a first result. The client applies deterministic symmetric encryption to the keyword to form a deterministically encrypted keyword, then computes a modular inverse of the deterministically encrypted keyword, and then applies at least partially homomorphic encryption to the modular inverse deterministically encrypted keyword to form a second result. The client uses a session key to hash the first result to form a hash result. The client combines the first result and second result to form a third result. The client encrypts the third result and the has result using a private key to generate the search query. The client sends the search query to the server. The server receives the search query from the client. The server identifies at least one identifier of at least one document of the at least partially homomorphically encrypted documents including the keyword by decrypting, using a public key, a product of the search query and the hash result. The server sends the at least one identifier in encrypted form to the client. The client decrypts the at least one identifier.

The search query may include a search token (a representation or indication of the keyword) and authorisation.

Probabilistic encryption uses randomness in an encryption algorithm. As a result, generally, each time the same message is encrypted it will give a different ciphertext. In contrast, deterministic encryption produces the same ciphertext for the same message and key.

Homomorphic encryption is a type of encryption that enables computation on ciphertexts or, in other words, on already encrypted data. A ciphertext' is the result of encryption performed on, plaintext using an algorithm. Homomorphic encryption generates an encrypted result which, when decrypted, matches the result of the operations as if they had been performed on the plaintext. When applied to a database, homomorphic encryption provides an environment where data remains confidential to the database tasked with operating on it.

A fully homomorphic encryption, system can encrypt a value that can be added and multiplied by another encrypted value. A partially homomorphic encryption algorithms can only perform either multiplication or addition. In order for a plaintext value to accommodate both multiplication and addition, it is encrypted separately by two different partially homomorphic encryption algorithms. At least partially homomorphically encrypted documents may be encrypted either fully horn omorphically or partially homomorphically.

Master keys, which are stored in secure hardware in this example, in the client, are used to encrypt all other keys in a system. A master key is used only to encipher and decipher, other keys. In other words, protect other cryptographic keys. All other keys that are encrypted under a master key are stored outside the protected area of the client. This is an effective way to protect a large number of keys while needing to provide physical security for only the master key or master keys.

A session key is a single-use symmetric key used for encrypting all messages in one communication session. A symmetric key is the same (or at least there may be a simple transformation to go between the two keys) for both encryption of plaintext and decryption of ciphertext. The keys represent a shared secret between two or more parties.

This requirement that both parties have access to the secret key is one of the main drawbacks of symmetric key encryption, in comparison to public-key encryption, which is also known as asymmetric key encryption.

Public keys are used in public-key cryptography. Public cryptography uses a pair of keys: a public key which may be disseminated widely, and a private key which is known only to the owner. This arrangement carries out an authentication function by verifying that a holder of a paired private key sent a message. This, arrangement also carries out an encryption function as only a paired private key holder can decrypt a message encrypted with the public key. A private key is a cryptographic key that can be obtained and used by anyone to encrypt messages intended for a particular recipient. In this way, encrypted messages can be deciphered only by using a second key that is known only to the recipient.

A trapdoor function is a function that is easy to compute in one direction, but difficult to compute in the opposite or inverse direction without special information. The special information is called a trapdoor.

A hash function is a function that maps data of any size to data of a fixed size. Data is hashed by applying a hash function to the data. The values returned by a hash function are called, amongst other things, hashes or hash results. Hash tables may be, used to readily indicate the mapping between input data and hashes. Hash functions are useful in cryptography. This is because they can be used to easily verify that some input data, maps to a given hash. However if the input data is unknown, it is difficult to find it out based on the hash.

An aspect of the present disclosure, there is provided a method of a client searching, for a keyword in at least partially homomorphically encrypted documents stored in a server, the method comprising: step a: the client applying probabilistic symmetric encryption to a keyword to form a first result; step b: the client applying deterministic symmetric encryption to the keyword to form a deterministically encrypted keyword, then computing a modular inverse of the deterministically encrypted keyword, and then applying at least, partially homomorphic encryption to the modular inverse deterministically encrypted keyword to, form a second result; step c: the client using a session key to hash the first result to, form a hash result; the client combining the first result of step a and the second result of step b to form a third result; the client encrypting the third result and the hash result using a private key to generate a search query; the client sending the search query to the server; the server receiving the search query from, the client; the server identifying at least one identifier of at least one document of the at least partially homomorphically encrypted documents including the keyword by decrypting, using a public key, a product of the search query and the hash, result; the server sending the at least one identifier in encrypted form to the client; and the client decrypting the at least one identifier.

The client may download at least one of the at least partially homomorphically encrypted documents identified by the at least one identifier. The client may decrypt the at least one of the at least partially homomorphically encrypted documents using a public key. The at least partially homomorphic encryption may use the Ron Rivest, Adi Shamir and Leonard Adleman algorithm RSA. The keyword may comprise a single word, a plurality of words or a character string.

In another aspect of the present disclosure, there is provided a method of encrypting a document in a client computer wherein the document comprises keywords and at least one identifier for identifying the document, the method comprising the client computer: symmetrically encrypting each keyword of the document using a master key to form encrypted keywords; and at least partially homomorphically encrypting the encrypted keywords using a private key to form an encrypted document.

The method may further comprise sending the encrypted document to a server. The at least partially homomorphic encrypting may use the Ron Rivest, Adi Shamir and Leonard Adleman algorithm, RSA. The keywords may comprise single words, a plurality of words or character strings.

In another aspect of the present disclosure, there is provided a method of generating, at a client computer, an encrypted search query for a keyword in an at least one partially homomorphically encrypted document stored at a server, the method comprising: step a: applying probabilistic symmetric encryption to, the keyword to form a first result; step b: applying deterministic symmetric encryption to the keyword to form a deterministically encrypted keyword, then computing a modular inverse of the deterministically encrypted keyword, and then applying at least partially homomorphic encryption to the modular inverse deterministically encrypted keyword to form a second result; step c: using a session key to hash the first result to form a hash result; combining the first result of step a and the second result of step b to form a third result; encrypting the third result and the hash result using a private key to generate the search query; and sending the search query to the server.

The at least partially homomorphic encrypting, may use the Ron Rivest, Adi Shamir and Leonard Adleman algorithm, RSA. The keyword may comprise a single word, a plurality of words or a character string.

In another aspect of the present disclosure, there is provided a method of identifying at least one document including a keyword in documents, stored in a server, wherein the documents are at least partially homomorphically encrypted by a trapdoor function and the documents are each identified by at least one identifier; the method comprising: receiving at the server an at least partially homomorphically encrypted, hashed, symmetrically encrypted keyword from a client; the server identifying at least one identifier of at least one document of the at least partially homomorphically encrypted documents including the keyword by decrypting, using a public key, a combination of the trapdoor function and a hash result of using a session key to hash the keyword that has been probabilistically symmetrically encrypted; and sending the at least one identifier to the client.

The at least partially homomorphic encrypting may use the Ron Rivest, Adi Shamir and Leonard Adleman algorithm, RSA. The keyword may comprise a single word, a plurality of words or a character string.

In another aspect of the present disclosure, there is provided a client-server computer system for a client to search for a keyword in at least partially homomorphically encrypted documents stored in a server, the client-server computer system being configured such that: the client applies probabilistic symmetric encryption to a keyword to form a first result; the client applies deterministic symmetric encryption to the keyword to form a deterministically encrypted keyword, then computing a modular inverse of the deterministically encrypted keyword, and then applying at least partially homomorphic encryption to the modular inverse deterministically encrypted keyword to form a second result; the client using a session key to hash the first result to form a hash result; the client combines the first result and the second result to form a third result; the client encrypts the third result and the hash result using a private key to, generate the search query; the client sends the search query to the server; the server receives the search query from the client; the server identifies at least one identifier of at least one document of the at least partially homomorphically encrypted documents including the keyword by decrypting, using, a public key, a product of the search query and the hash result; the server sends the at least one identifier in encrypted form to the client; and the client decrypts the at least one identifier.

The client-server computer system may be configured such that the client downloads at least one of the at least partially homomorphically encrypted documents identified by the at least one identifier. The client-server computer system may further comprise the client decrypting the at least one of the at least partially homomorphically encrypted documents using a public key. The at least partially homomorphic encryption may use the Ron Rivest, Adi Shamir and Leonard Adleman algorithm, RSA. The keyword may comprise a single word, a plurality of words or a character string.

In another aspect of the present disclosure, there is provided a client computer, the client computer being configured to encrypt a stored document in the client computer wherein the document comprises keywords and at least one identifier for identifying the document, the client computer being configured to: symmetrically encrypt each keyword of the document using a master key to form encrypted keywords; and at least partially homomorphically encrypt the encrypted keywords using a private key to form an encrypted document.

The client computer may be further configured to send the encrypted document to a server. The at least partially homomorphic encryption may use the Ron Rivest, Adi Shamir, and Leonard Adleman algorithm, RSA. The keywords may comprise single words, a plurality of words or character strings.

In another aspect of the present disclosure, there is, provided a client computer, the client computer being configured to generate an encrypted search query for a keyword in an at least one partially homomorphically encrypted document stored at a server, the client computer being configured to: apply probabilistic symmetric encryption to the keyword to form a first result; apply deterministic symmetric encryption to the keyword to form a deterministically encrypted keyword, then computing a modular inverse of the deterministically encrypted keyword, and then applying at least partially homomorphic encryption to the modular inverse deterministically encrypted keyword to form a second result; use a session key to hash the first result to form a hash result; combine the first result and the second result to form a third result; encrypt the third result and the hash result using a private key to generate the search query; and send the search query to the server.

The at least partially homomorphic encryption may use the Ron Rivest, Adi Shamir and Leonard Adleman algorithm, RSA. The keyword may comprise a single word, a plurality of words or a character string.

In another aspect of the present disclosure, there is provided a server, the server being configured to identify at least one document including a keyword in documents, stored in the server, wherein the documents are at least partially homomorphically encrypted by a trapdoor function and the documents are each identified by at least one identifier; the server being configured to: receive an at least partially homomorphically encrypted, hashed symmetrically encrypted keyword from a client; identify at, least one identifier of at least one document of the at least partially homomorphically encrypted documents including the keyword by decrypting, using a public key, a combination of the trapdoor function and a hash result of using a session key to hash the keyword that, has been probabilistically symmetrically encrypted; and send the at least one identifier to a client.

The at least partially homomorphic encryption may use the Ron Rivest, Adi Shamir and Leonard Adlerian algorithm, RSA. The keyword may comprise a single word, a plurality of words or a character string.

A computer program for carrying out the method described above, may be provided. A non-transitory computer-readable medium on which are encoded instructions for carrying out the method described above may be provided. The computer-readable medium may be, for example, a hard disk-drive, a solid state drive, such as a USB stick, or a CD-ROM or DVD-ROM.

BRIEF DESCRIPTION OF THE DRAWINGS

The invention will be described in more detail, by way of example with reference to, the accompanying drawings, in which.

DETAILED DESCRIPTION OF THE INVENTION

Figure 1:
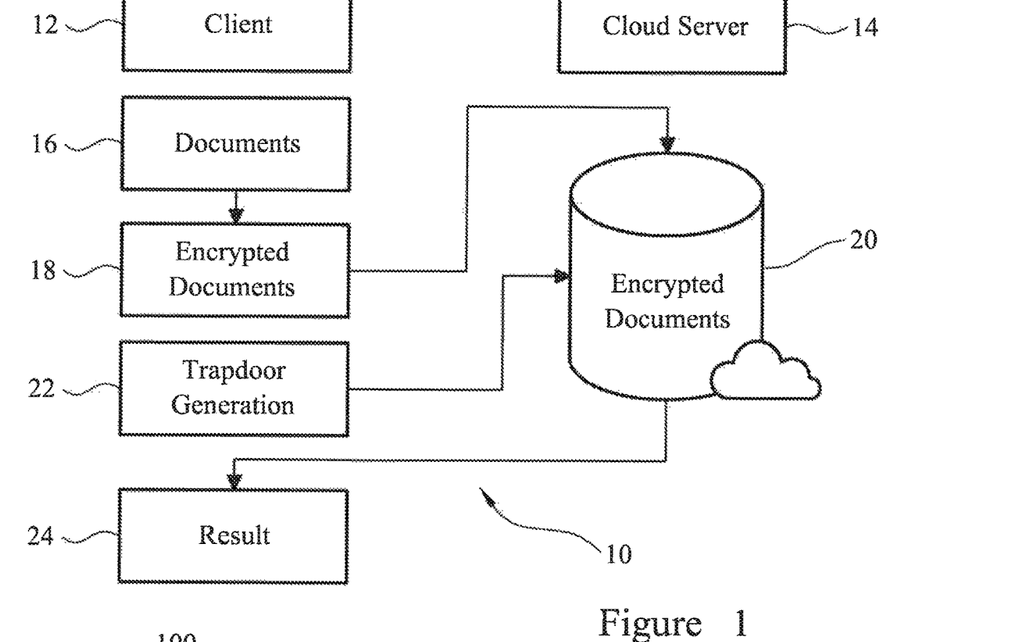
FIG. 1 is a schematic diagram of a computer system embodying an aspect of the present invention.

An example computer system will now be described with reference to FIG. 1.

The computer system 10 takes the form is a client-server computer system and comprises, a client 12 and a server or cloud server 14. The client may be, for example, a desktop computer, a laptop computer, a tablet computer or a smartphone. The client is in communication connection with the server over a computer network, in this example, the Internet. The client has documents (D) 16 stored on it.

The client 12 generates a master key K used for symmetric key encryption, a session key $k_s$ used for computing a cryptographic keyed hash function and asymmetric key pairs $(k_{pub}, k_{pri})$ for RSA. The session key $k_s$ and the public key $k_{pub}$ are shared with the cloud server 14 over the Internet.

The documents 16 are encrypted, to form encrypted documents 18, such that the client 12 accesses each keyword within each document. Firstly, symmetric encryption, in this example, Advanced Encryption Standard-Electronic Codebook (AES-ECB) of each keyword of each document is performed using the master key K. Then, the RSA (partial homomorphic encryption) of the documents is computed using the private key $(k_{pri})$. Document identifiers are also encrypted using Advanced Encryption Standard-Cipher Block Chaining (AES-CBC), where AES-CBC, represents a probabilistic encryption algorithm. The entire encryption algorithm can be processed in parallel by using multi-threading. As discussed above, this algorithm supports the update, addition or removal of a document from the database as a predefined data structure is not required in this homomorphic-based Searchable Encryption (HSE) scheme. The encrypted documents are then sent to the server 14 over the Internet. The encrypted documents 20 are stored at the server in a database and, in particular a dynamic database. As a result, documents in the database can be updated, new documents inserted or documents deleted without the need for pre-processing and re-encrypting the entire database. The non-encrypted documents stored at the client may then be deleted.

If a user of the client 12, wishes to carry out a search using a keyword (or search term, which may include a plurality of keywords or a character string), he enters the key word into the client, such as using a keyboard of the client. The client 12 then generates a trapdoor (search query) for the keyword and sends it to the cloud server 14. This is illustrated in FIG. 1 by reference numeral 22. The trapdoor or trapdoor function is generated such that the client computes b using a probabilistic symmetric encryption algorithm and then computes z using a deterministic symmetric encryption algorithm. z is already computed in the encryption phase and represented as a. Now the client computes the modular inverse $c \leftarrow z^{-1}$ mod N and performs the RSA represented as j. To, make the trapdoor probabilistic, the client multiplies b and j. The trapdoor is encrypted using the private key $k_{pri}$ and $T_W$ transmitted to the cloud server.

The encrypted trapdoor is received at the cloud server 14. The cloud server decrypts the trapdoor using the public key $k_{pub}$. This provides non-repudiation as it proves the authenticity and integrity of the data originating from the source. Using the trapdoor $T_W$, the cloud server searches for the documents (which are encrypted) containing the required keyword. The search is done against every encrypted keyword within the documents. The desired keyword is identified such that $g==H_{k_s}(f \cdot r)$ mod N. The searching is entirely based on the partially homomorphic property of RSA. The inventors have appreciated that f and r are actually inverses of each other so $E(f) \cdot Enc(r) = Enc(f \cdot r) = Enc(1)$. The hash is computed in order to identify the keyword when the trapdoor is probabilistic. Therefore, a unique trapdoor appears before the cloud server every time even for the same keyword searched repeatedly. This helps resist distinguishability attacks and prevent search pattern leakage. Upon identification, the result is that the encrypted document identifiers are sent to the client 12, in this example, over the Internet (illustrated in FIG. 1 by reference numeral 24). Since the underlying encryption and inverses are distinct, this leads to the correctness of the scheme. Furthermore, the trapdoor generation is based on ranked searchable encryption and ranked multi-keyword searchable encryption.

A decryption phase is then run by the client 12 to uncover the underlying document identifiers. In other words, the identity of the encrypted document or documents from the set of encrypted documents that include the keyword or search term. Later on, the identified encrypted documents are downloaded from the cloud server to the client. The client then decrypts the downloaded documents using the public key $k_{pub}$. These unencrypted documents are then searched by the client for the keyword or search term. The result is displayed on a display of the client.

The mathematical description of the arrangement described above is as follows.

Definition (Homomorphic-based Searchable Encryption Scheme (HSE)): The proposed HSE comprises five polynomial time algorithms $\Pi$=(KeyGen, Encryption, Build_Trap, Search_Outcome, Decryption) such that:

$(k_{pub}, k_{pri}, K, k_s) \leftarrow$ KeyGen$(p, q, \lambda)$: represents a probabilistic key generation algorithm. The algorithm takes the security parameter $(\lambda)$ and large prime numbers $(p, q)$ as the input. The output is a master key (K), session key $(k_s)$, public key $k_{pub}=(e,n)$ and a private key $k_{pri}=(d,n)$. This algorithm is run by the client.

$(Enc(D)) \leftarrow$ Encryption$(K, k_{pri}, D)$: is a deterministic algorithm run by the client. The algorithm takes the master key (K), private key $(k_{pri})$ and the document set D as the input and outputs an encrypted document (Enc(D)).

$T_W \leftarrow$ Build_Trap$(K, k_s, k_{pri}, W)$: is a probabilistic algorithm run by the client. The algorithm takes the master key (K), session key $(k_s)$, private key $(k_{pri})$ and the keyword (W)

as the input and outputs a probethilistic trapdoor ($T_W$) generated for the keyword (W).

$X \leftarrow$ Search_Outcome($k_s$, $k_{pub}$, Enc(D), $T_W$): is a deterministic algorithm run by, the cloud server. The algorithm takes the session key ($k_s$), the public key ($k_{pub}$), encrypted documents Enc(D), and the trapdoor ($T_W$) as the input and outputs a set (X) of encrypted document identifiers $Enc_K$(id ($D_i$)).

$D_i \leftarrow$ Dec(K, $k_{pub}$, X): is a deterministic algorithm that requires the client's master key (K), public key $k_{pub}$ and encrypted set of document identifiers $Enc_K$ (id($D_i$)) to decrypt and recover the document id's. This algorithm is run by the client.

Keyword-Trapdoor Indistinguishability refers to the capability of a searchable encryption scheme to resist distinguishability attacks. Therefore, even for the same keyword searched again, a unique trapdoor is generated. This keeps the adversary, from launching passive attacks. Keyword-Trapdoor indistinguishability should hold true even if the adversary S maintaining a history of searches and adaptively chooses the keyword to be searched.

Definition 6.1 Let HSE=(KeyGen, Encryption, Build_Trap, Search_Outcome, Dec) be a Homomorphic-based Searchable Encryption Scheme over a set of documents D={$D_1, D_2, \ldots, D_n$}, λ be the security parameter, p,q be the prime numbers and A=($A_1, \ldots, A_{m+1}$) represent adversaries. Consider the following probabilistic experiment Key_Trap$_{HSE,A}$(λ):

Key_Trap$_{HSE, A}$(λ)
    ($k_{pub}, k_{pri}, K, k_s$)←KeyGen(P,q,λ)
    (Enc(D))←Encryption(K, $k_{pri}$, D)
    for 1≤i≤m; where m=|W|; W={$W_1, W_2, \ldots W_m$} and W ∈ D
        ($st_A, W_l$)←$A_i$($st_A, T_{W_1}, \ldots, T_{W_i}$)
        $T_{W_i}$←Build_Trap(K, $k_s, k_{pri}, W_l$)
    b←$^\$${0,1}
    ($St_A, W_0, W_1$)←$A_0$(λ)
    ($T_{W_b}$)←Build_Trap$_{K,K_{pri}}$($k_s, W_b$)
    b'←$A_{m+1}$($st_A, T_{W_b}$)
    T'$_W$←Build_Trap$_{K,K_{pri}}$($k_s, W_j$); 1≤j≤m
    if b'=b, output 1
    otherwise output 0 where $st_A$ represents a string that captures A's state. The keyword-trapdoor indistinguishability holds for all the polynomial-size adversaries ($A_0, A_1, \ldots, A_{m+1}$) such that m=poly(λ), $Pr[\text{Key\_Trap}_{HSE,A}(\lambda)=1] \leq \frac{1}{2} + \text{negl}(\lambda)$ Trapdoor-Document Indistinguishability refers to the complexity offered by an HSE scheme. The keywords, trapdoor and encrypted documents should be complex, and involved in such a way that the trapdoor should not reveal the corresponding document and/or document identifiers prior to the search, and should not be distinguishable. This holds true for the same keyword searched again and the trapdoor should not be distinguishable even if the history (keyword, trapdoor, encrypted document) is generated adaptively.

Definition 6.2 Let HSE=(KeyGen, Encryption, Build_Trap, Search_Outcome, Dec) be a Homomorphic-based Searchable Encryption scheme over a set of documents D={D1, D2, \ldots, Dn}, λ be the security parameter and p,q be the prime numbers, A=($A_0, A_1$) represent the adversaries. Consider the following probabilistic experiment Trap_Doc$HSE,_A$ (λ):

Key_Doc$_{HSE, A}$(λ)
    ($k_{pub}, k_{pri}, K, k_s$)←KeyGen(λ)
    (Enc(D))←Encryption(K, $k_{pri}$, D)
    for 1≤i≤n;
        let D'=D'∪Enc($D_i$)
        let W=($W_1, \ldots, W_l$)
        $T_{W_i}$←Build_Trap(K, $k_{pri}, k_s, W_i$)
        b←$^\$${0,1}
        ($st_A, W_0, W_1$)←$A_0$($st_A$, λ, $W_m$, D', $T_{W_m}$)
        ($T_{W_b}$)←Build_Trap$_{K,K_{pri}}$($k_s, W_b$)
        b'←$A_1$($st_A, D_{W_b}, k_{pub}$)
        if b'=b, output 1
        otherwise output 0 where $st_A$ represents a string that captures A's state. The keyword-trapdoor indistinguishability holds if for the polynomial-size adversaries ($A_0, A_1$), $Pr[\text{Trap\_Doc}_{HSE,A}(\lambda)=1] \leq \frac{1}{2} + \text{negl}(\lambda)$ where probability is over the choice of b.

Theorem 6.1: The proposed HSE scheme provides Keyword-Trapdoor Indistinguishability and Trapdoor-Document Indistinguishability if the trapdoors are probabilistic and the documents are homomorphically encrypted This section gives a a mathematical description of the proposed HSE scheme described above.

Phase 1—KeyGen (p,q,λ): Given a security parameter λ, two prime numbers p and q, and generate random keys K, $k_s$ ← {0,1}$^\lambda$. Compute:
    N=p*q and φ(N)=(p−1)(q−1).
    a random integer e|(gcd(e,φ)=1, ed≡1 mod φ(N)).
    d|ed≡1 mod φ(N)),
    Output the master key K, session key $k_s$, public key $k_{pub}$=(e,N) and private key $k_{pri}$=(d,N).

Phase 2—Encryption (K, $k_{pri}$, D):
    For 1≤t≤n:
    For 1≤u≤|$D_t$|:
    let a←($Enc_K(W_u)$), where $W_u \in D_t$ and $Enc_K$ represents a symmetric encryption algorithm.
    Compute r=$a^d$ mod N.
    $W_u$←r.
    Compute Enc−Prob$_K$(id($D_t$)), where Enc−Prob$_K$ represents a probabilistic, symmetric encryption algorithm
    Output encrypted documents Enc(D) and outsource, send or transmit to the cloud server.

Phase 3—Build_Trap (K, $k_s, k_{pri}$, W):
    let b←(Enc−Prob$_K$(W)).
    let z←($Enc_K$(W)).
    let c←$z^{-1}$ mod N.
    let j←$c^d$ mod N.
    let f←b·j mod N.
    let g←$H_{k_s}$(b).
    t←(f,g).
    ($T_W$)←$t^d$ mod N.
    Transmit $T_W$ to the cloud server.

Phase 4—Search_Outcome ($k_s, k_{pub}, T_W$)): Identify the documents Di ∈ D as the outcome of the search as follows:
    Initialize dynamic array X.
    (f,g)←($T_W$)$^e$ mod N
    for 1≤h≤n:
    for 1≤i≤|Enc($D_h$)|:
    if (g==$H_k$(f·$W_i$) mod N).
    X←$Enc_K$(id($D_h$)).
    Output X, a set of encrypted document identifiers and return to the client.

Phase 5—Dec (K, $k_{pub}$, X): Given X a set of encrypted document identifiers, decrypt X using the public key $k_{pub}$ and the master key K to uncover the outcome of the search.

The following section analyses the security of the proposed HSE scheme according to the security definitions presented above. Before proceeding towards the formal security proofs, the leakage profiles are analyzed.

The leakage profiles highlight all the information given out by the artefacts evolved during the execution of phases of the HSE scheme that may lead to possible security and privacy concerns. The analysis includes the artefacts obtained from the five polynomial time algorithms explained previously, i.e., encrypted documents, trapdoor TW and the outcome of the search. The leakage focuses on the information that is revealed within polynomial time.

Leakage $L_{6.1}$

Description: The leakage $L_{6.1}$ is associated to, the encrypted documents Enc(D). It is assumed the encrypted documents are revealed to, all the stakeholders, i.e., the client, the cloud server and the adversary A. This leakage is defined as:

$$L_1(Enc(D)) = \begin{cases} \text{Encrypted keywords } (r), \text{ total number of documents } (n), \\ \text{Encrypted document identifiers } (Enc - Prob_k(id(D_n))), \\ \text{Total number of encrypted keywords } (m), \\ \text{Encrypted documents } Enc(D) \end{cases}$$

Leakage $L_{6.2}$

The leakage $L_{6.2}$ is associated to the Trapdoor $T_W$ generated for a particular keyword W to be searched. It is assumed that $T_W$ is generated by the client and revealed to all the stakeholders, i.e., the cloud server and the adversary A.

$$L_{6.2}(T_W) = \begin{cases} f \leftarrow (Enc - Prob_K(W_m)) \cdot z^{-1} \bmod N, \\ g \leftarrow H_{k_s}(Enc - Prob_K(W_m)) \end{cases}$$

Leakage $L_{6.3}$

The leakage $L_{6.3}$ is associated to search outcome (SO) of the trapdoor generated for a particular keyword $T_W$. The search outcome is revealed to all the stakeholders, i.e., the client, cloud server and the adversary A This leakage is defined as:

$$L_{6.3}(SO) = \{OC(W), Enc_K(id(D_i)) \forall T_W \in D\}$$

where OC represents the relevant outcome corresponding to the searched keyword.

Discussion on Leakage: It may be observed that the majority of the leakages $L_{6.1}$, $L_{6.2}$ and $L_{6.3}$ described above are either hashed or encrypted. Furthermore, the proposed scheme is based on probabilistic trapdoors that resist distinguishability attacks and prevent against search pattern leakage.

The next section extends the security analysis by taking these leakage profiles into consideration in the following formal security proofs.

Lemma 6.1. The homomorphic-based searchable encryption scheme (HSE) presented is "privacy-preserving" as it is $(L_{6.1}, L_{6.2}, L_{6.3})$-secure and according to Definition 6.1, 6.2, where, $L_{6.1}$ is associated with the encrypted documents Enc(D) and leaks the encrypted keywords, total number of documents, total number of encrypted keywords and the encrypted documents. $L_{6.2}$ is associated to the trapdoor $T_W$, generated for a keyword and leaks f,g and $L_{6.3}$ leaks the outcome of a search against the trapdoor $T_W$ and the encrypted document identifiers.

Proof: The proof of this lemma flows directly from the proof of the Theorem 6.1. This is done by taking a game-based approach and by simulating the keyword trapdoor indistinguishaibility and trapdoor-document indistinguishability definitions for the proposed HSE scheme. The proof requires an adversary A and a challenger C. The proof is based on the assumption that if the adversary is able to distinguish between the outcome of the algorithms and between the keywords, trapdoors and the encrypted document identifiers, t will result in compromising the privacy-preserving property of HSE scheme. The game-based approach is divided into three phases, i.e., the setup phase challenge phase and the outcome phase.

Keyword-Trapdoor Indistinguishability in HSE:

Let HSE be a Homomorphic-based Searchable Encryption scheme. Given n documents $D=\{D_1, D_2, \ldots, D_n\}$ and m keywords $W=\{W_1, W_2, \ldots W_m\}$ where $W \in D$. The game is played between an adversary A and a challenger C as follows:

Setup Phase: The adversary A selects a keyword $W \in W$ and sends it to the challenger C. The challenger C returns a trapdoor $T_W$ corresponding to the keyword W to the adversary A. This continues between the adversary A and the challenger C until all the trapdoors and associated keywords have not been shared with the adversary.

Challenge Phase: The adversary A selects two keywords $W'_0$, $W'_1$ and sends them to the challenger C. The selection of the keywords is done; such that the keywords are unique i.e., W. The challenger C in response tosses a fair coin $b \leftarrow \{0,1\}$ and generates a trapdoor $T'_{W'_b}$. After the challenge has been completed, the setup phase is run again and the adversary is allowed to query the same keywords again.

Outcome Phase: Adversary A is given the generated Trapdoor $T'_{W'_b}$ and it will now have to guess and output $b' \in \{0,1\}$ and if b=b' then the adversary ins. In other words the adversary A has to correctly guess the keyword associated to the trapdoor $T'_{W'_b}$ in polynomial time. If the adversary A correctly guesses the keyword corresponding to the trapdoor, then it has won otherwise HSE provides keyword-trapdoor indistinguishability and the challenger C wins.

Therefore, as the trapdoors are probabilistic, the probability that the adversary A wins is ½ which is according to the definition 6.1.

Trapdoor-Document Indistinguishability in HSE:

Let HSE be a Homomorphic-based Searchable Encryption scheme. Let D represent the set of documents $\{D_1, D_2, \ldots, D_n\}$ and W represent a set of keywords $\{W_1, W_2, \ldots, W_m\}$ contained in D. The game is played between an adversary A and a challenger C. The game is divided into three phases as follows.

Setup Phase: The adversary A chooses a keyword $W \in W$ and sends it to the challenger C. The challenger generates a trapdoor $T_W$ and sends the associated encrypted document identifiers $Enc(id(D_i))$ to the adversary A. This continues until the adversary A has not queried all the keywords.

Challenge Phase: The adversary A selects two keywords $W'_0$, $W'_1 \in W$ and sends them to the challenger C. The selection of the keywords is done such that $W'_0 \neq W'_1$. The challenger C in response tosses a fair coin $b \leftarrow \{0,1\}$ and generates a trapdoor corresponding to the value of b, i.e., $T'_{W'_b}$. After the challenge has been completed the adversary A is given access to the previously generated history that was sent in setup phase and allowed to query the same keywords again.

Outcome Phase: A is given the generated Trapdoor $T'_{W'_b}$. Adversary A will now have to guess and return the document identifiers corresponding to the Trapdoor $T'_{W'_b}$ in polynomial time. The adversary A wins if the guess is correct, otherwise HSE provides trapdoor-document indistinguishability, and the challenger C wins.

Therefore, the probability that he adverse A wins is ½ which is in-line with the above stated definition 6.2.

Proof of the Theorem 6.1 leads to the following corolla

Corollary 6.1: Keyword-Trapdoor Indistinguishability and Trapdoor-Document Indistinguishability results in a Privacy Preserving Homomorphic-based Searchable Encryption Scheme.

Proof Sketch: Let HSE=(KeyGen, Encryption, Build_Trap, Search_Outcome, Dec) be a Homomorphic-based Searchable Encryption scheme. It is already proved that the scheme provides Keyword-Trapdoor Indistinguishability and Trapdoor Document Indistinguishability. It is now to prove that the leakages $L_{6.1}$, $L_{6.2}$ and $L_{6.3}$ do not affect the security of the HSE scheme and is privacy-preserving. The HSE scheme described herein is based on trusted atomic primitives such as hash, RSA, and AES. The only leakage associated to $L_{6.1}$ is the total number of documents and the total number of keywords that are contained within the dataset. However, the documents and the keywords themselves are fully encrypted and the adversary cannot uncover them. Whereas, the leakages $L_{6.2}$ and $L_{6.3}$ are fully encrypted or hashed and do not leak any information that would weaken the Keyword-Trapdoor Indistinguishability or Trapdoor-Document Indistinguishability properties of the HSE. Therefore, the proposed HSE is privacy-preserving and provides Keyword Trapdoor Indistinguishability or Trapdoor-Document Indistinguishability.

The following, section analyses the performance of the proposed HSE, scheme. This, is achieved two-fold; firstly the asymptotic analysis is performed and then the storage, overhead is discussed. The performance analysis highlights the theoretical feasibility of the proposed HSE scheme.

This section further studies the proposed scheme by performing the asymptotic analysis. The analysis includes the upper bound complexity analysis of the individual phases that are, involved in the scheme. The complexity associated to the keywords and the documents is represents by m and n respectively. As discussed above, the proposed HSE scheme comprises five polynomial time algorithms.

The computational complexity of the KeyGen phase comprises the multiplication of two large prime numbers p and q represented by $\Theta(l^2)$ where l represents the size of the prime numbers p and q. The greatest common divisor (gcd) is also computed twice which is represented by $\Theta(2 \log(N))$. As a result, the total computational complexity of the KeyGen phase is $\Theta(l^2+2 \log(N))$.

The computational complexity of the encryption phase is calculated such that it require a nested for-loop over encryption of the keywords, performing the exponentiation and encrypting the documents identifiers. Thus, the complexity is $\Theta(E(Umn+n))$, where E represents the complexity associated to the encryption and U represents the exponentiation complexity, against the random number e.

The computational complexity for the trapdoor generation is $\Theta(2E+2U \log(m)+2)$. The complexity for the Search_Outcome is $\Theta(mn+1)$. Table 6.1 below includes the algorithmic complexities of the proposed HSE scheme against a scheme that will be based on the standard RSA without probabilistic trapdoors. This indicates that the proposed HSE scheme provides higher levels of security and privacy guarantees at the cost of increased computations.

TABLE 6.1

Algorithmic Comparative Analysis HSE vs. RSA-based SE

| Schemes | Encryption | Build_Trap | Search_Outcome |
| --- | --- | --- | --- |
| Proposed HSE | $\Theta(E(Umn + n))$ | $\Theta(2E + U\log(m) + 2)\Theta(mn + 1)$ | |
| RSA-based SE | $\Theta(Umn + En)$ | $\Theta(U + 2)$ | $\Theta(mn + 1)$ |

TABLE 6.2

Algorithmic Comparative Analysis HSE vs. Existing Schemes

| Schemes | Encryption | Build_Trap | Search_Outcome |
| --- | --- | --- | --- |
| [30] & [31] | $\Theta(3\lambda mn)$ | $\Theta(\lambda m)$ | $\Theta(2n(\lambda m + m + num))$ |
| [96] | $\Theta(E(3mn + n))$ | $\Theta(E(3m + 1)$ | $\Theta(mn + n)$ |
| Proposed HSE | $\Theta(E(Umn + n))$ | $\Theta(2E + 2U\log(m) + 2)$ | $\Theta(mn + 1)$ |

Note:
λ represents the security parameter, num represents the number of occurrences of a substring within a path.

This section discusses the storage overhead of the proposed HSE scheme. As mentioned above, the client has to store the master key K, a session key $k_s$ and asymmetric key pairs $(k_{pub}, k_{pri})$. The storage overhead for storing the master key K, a session key $k_s$ is 128 bits each. Whereas, the asymmetric key pairs $(k_{pub}, k_{pri})$ require 2048 bits. Therefore, the storage at the client-side is 128*2+2048=(2304/8) bytes. Referring to the storage at the cloud server, it has to store a session key $k_s$ and a public key $k_{pub}$ requiring 128+1024=1152 bits. Suppose the average storage required by an encrypted document is represented by $D_{avg}$, the storage at the cloud server will be 1152+n*$D_{avg}$ bits.

This section implements the proof of concept prototype and tests it over a real-world dataset.

The implementation is done in the general purpose computer programming language JAVA and the workstation used is an Intel Core i5 CPU running at 3.00 GHz and 8 GB of RAM. The symmetric encryption algorithm used is 128-bit AES-ECB and AES-CBC mode. RSA-1024 is used to achieve partially homomorphic asymmetric encryption. The cryptographic hash function used is SHA-256. The client side and the server side are implemented on the same machine, and the graphs are generated using MATLAB2016.

The KeyGen phase and the Decryption phase are similar to nearly all the existing schemes, therefore, the computational analysis of the computation overhead focuses mainly on the Encryption phase, Build_Trap phase and the Search_Outcome phase. The phases are analysed below.

Figure 2:
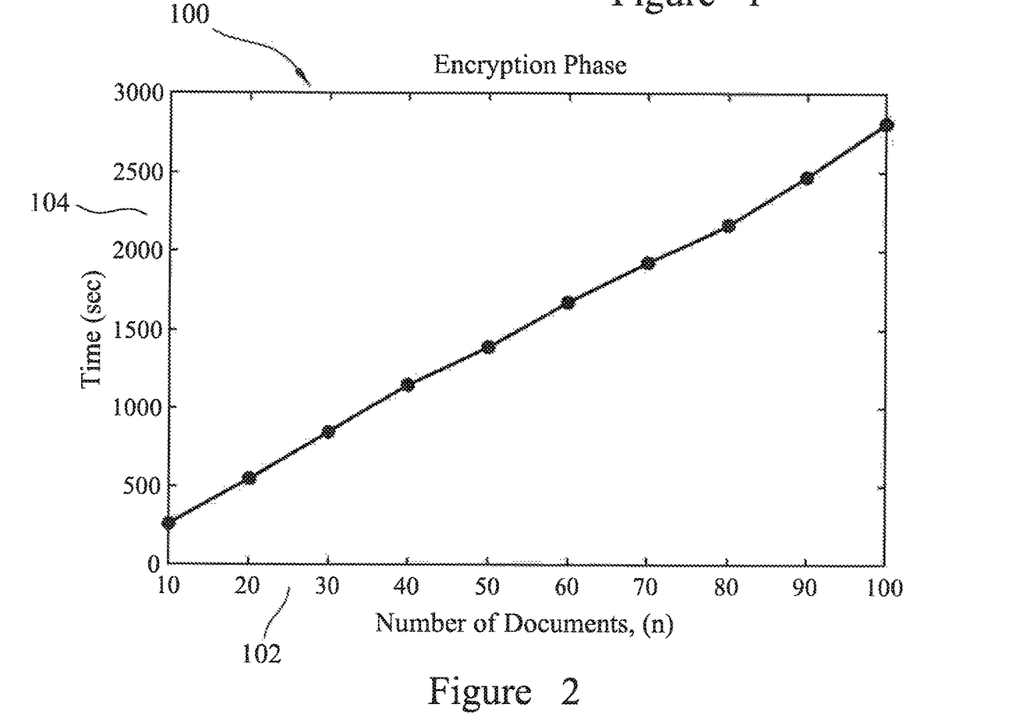
FIG. 2 is a graph indicating computational time for an encryption phase of the computer system of FIG. 1.

To analyze the computational time of the encryption phase, the implementation described above was implemented over 10 documents and scaled to 100 documents. In the graph 100 of FIG. 2, the number of documents is represented along the x-axis 102 and time in seconds is along the y-axis 104. The scheme shows a linear growth with the increase in the number of documents and takes a total of 2806 seconds for encrypting 100 documents.

To measure the computational time for the trapdoor generation, a trapdoor was generated for the keyword "about". It took, a constant time of 0.78 seconds.

Figure 3:
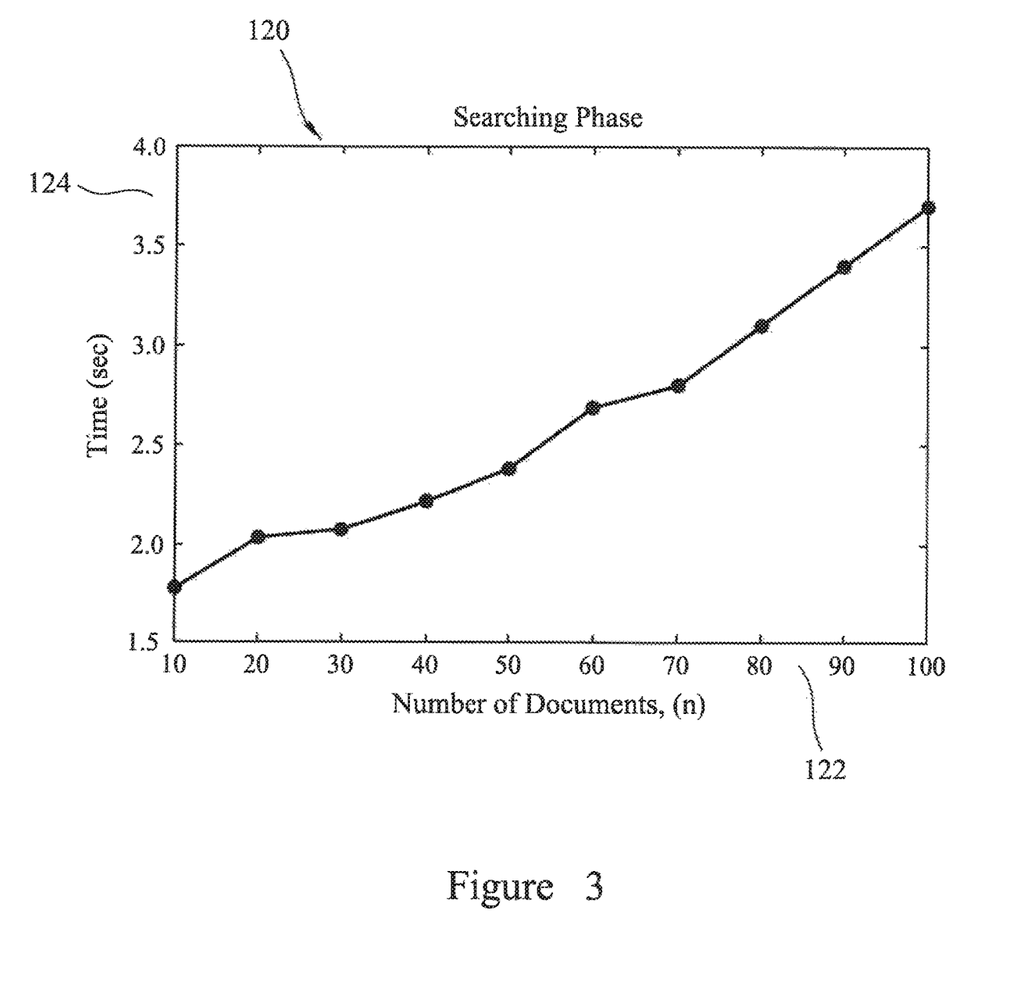
FIG. 3 is a graph indicating computational time for a searching phase of the computer system of FIG. 1.

To analyze the time for searching required by the cloud server, the keyword "about" was searched over the encrypted documents. As shown in the graph 120 of FIG. 3, the search space was ranged between 10 to 100 by varying the number of documents. The number of documents is presented along the x-axis 122 and the time in seconds is along the y-axis 124. The search phase shows a linear growth by taking 3.7 seconds over 100 documents.

Embodiments of the present invention have been described. It will be appreciated that variations and modifications may be made to the described embodiments within the scope of the present invention.

The invention claimed is:

1. A client-server computer system for a client to search for a keyword in at least partially homomorphically encrypted documents stored in a server, the client-server computer system being configured such that:
   the client applies probabilistic symmetric encryption to a keyword to form a first result;
   the client applies deterministic symmetric encryption to the keyword to form a deterministically encrypted keyword, then computing a modular inverse of the deterministically encrypted keyword, and then applying at least partially homomorphic encryption to the modular inverse deterministically encrypted keyword to form a second result;
   the client using a session key to hash the first result to form a hash result;
   the client combines the first result and the second result to form a third result;
   the client encrypts the third result and the hash result using a private key to generate a search query;
   the client sends the search query to the server;
   the server receives the search query from the client;
   the server identifies at least one identifier of at least one document of the at least partially homomorphically encrypted documents including the keyword by decrypting, using a public key, a product of the search query and the hash result;
   the server sends the at least one identifier in encrypted form to the client; and
   the client decrypts the at least one identifier.

2. A client-server computer system according to claim 1, being configured such that the client downloads at least one of the at least partially homomorphically encrypted documents identified by the at least one identifier.

3. A client-server computer system according to claim 2, further comprising the client decrypting the at least one of the at least partially homomorphically encrypted documents using a public key.

4. A client-server computer system according to claim 1, wherein the at least partially homomorphic encryption uses the Ron Rivest, Adi Shamir and Leonard Adleman algorithm, RSA.

5. A client-server computer system according to claim 1, wherein the keyword comprises a single word, a plurality of words or a character string.

6. A method in client-server computer system for a client to search for a keyword in at least partially homomorphically encrypted documents stored in a server, the method comprising:
   the client applying probabilistic symmetric encryption to a keyword to form a first result;
   the client applying deterministic symmetric encryption to the keyword to form a deterministically encrypted keyword, then computing a modular inverse of the deterministically encrypted keyword, and then applying at least partially homomorphic encryption to the modular inverse deterministically encrypted keyword to form a second result;
   the client using a session key to hash the first result to form a hash result;
   the client combining the first result and the second result to form a third result;
   the client encrypting the third result and the hash result using a private key to generate a search query;
   the client sending the search query to the server;
   the server receiving the search query from the client;
   the server identifying at least one identifier of at least one document of the at least partially homomorphically encrypted documents including the keyword by decrypting, using a public key, a product of the search query and the hash result;
   the server sending the at least one identifier in encrypted form to the client; and
   the client decrypting the at least one identifier.

7. A method according to claim 6, further comprising the client downloading at least one of the at least partially homomorphically encrypted documents identified by the at least one identifier.

8. A method according to claim 7, further comprising the client decrypting the at least one of the at least partially homomorphically encrypted documents using a public key.

9. A method according to claim 6, wherein the at least partially homomorphic encryption uses the Ron Rivest, Adi Shamir and Leonard Adleman algorithm, RSA.

10. A method according to claim 6, wherein the keyword comprises a single word, a plurality of words or a character string.

* * * * *